United States Patent [19]

Joulia

[11] Patent Number: 5,031,802
[45] Date of Patent: Jul. 16, 1991

[54] METERING BOTTLE

[75] Inventor: Gérard Joulia, Paris, France

[73] Assignee: L'Oreal, Paris, France

[21] Appl. No.: 479,245

[22] Filed: Feb. 13, 1990

[30] Foreign Application Priority Data

Feb. 14, 1989 [FR] France .................................. 89 01905

[51] Int. Cl.⁵ .............................................. B67D 5/06
[52] U.S. Cl. .................... 222/205; 222/207; 222/214; 222/383
[58] Field of Search .............. 222/205, 207, 209, 211, 222/214, 382, 383, 405

[56] References Cited

U.S. PATENT DOCUMENTS

| | | | |
|---|---|---|---|
| 2,311,367 | 2/1943 | Chambers | 222/205 X |
| 2,680,477 | 6/1954 | Schira, Jr. | 222/209 X |
| 3,171,446 | 3/1965 | Koch . | |
| 3,767,088 | 10/1973 | Deussen | 222/205 |
| 4,875,603 | 10/1989 | Weinstein | 222/205 |
| 4,936,490 | 6/1990 | Battegazzore | 222/205 |

FOREIGN PATENT DOCUMENTS

| | | | |
|---|---|---|---|
| 1333491 | 12/1962 | France . | |
| 2630712 | 11/1989 | France | 222/212 |
| 741427 | 1/1953 | United Kingdom . | |

Primary Examiner—Michael S. Huppert
Assistant Examiner—Gregory L. Huson
Attorney, Agent, or Firm—Cushman, Darby & Cushman

[57] ABSTRACT

The metering bottle for dispensing a dose of liquid when the cap of the bottle is removed. When the cap is fully on the bottle, it keeps a bellows compressed. When the cap is removed, the bellows is allowed to expand and the resulting suction causes a dose of liquid from the bottle to be sucked into the bellows via a plunger tube which sticks into the liquid and via an opening into the bellows chamber. A one-way valve at the opening into the bellows chamber then prevents the dose of liquid in the bellows chamber from flowing back into the bottle. When the dose of liquid is used and the bellows chamber is empty of liquid, the lid can be replaced. When the lid is replaced the bellows is collapsed. The air in the bellows chamber is then forced back through an air microhole in the one-way valve into the bottle.

7 Claims, 2 Drawing Sheets

METERING BOTTLE

BACKGROUND OF THE INVENTION

1. Field of the Invention

The invention relates to a metering bottle, in particular to a bottle designed to contain a liquid product, equipped with a device for automatic metering of amounts of liquid to be dispensed.

2. Brief Description of Related Art

Numerous dispensers for liquids comprising a metering device are known. There are particular dispensers in which the main reservoir communicates by means of a syphoning device with a dosing chamber. These devices are quite frequently complicated in their use and require, in comparison with standard bottles, additional motions by the user, such as pumping operations. Additionally, they generally comprise a large number of parts, which makes their manufacture relatively complicated.

Metering dispensers of the piston type are also known. These devices contain a receptacle comprising a dispensing opening connected with a movable piston in a chamber with which the receptacle is provided. The piston is designed to cover said dispensing opening after a short lapse of time at the time it is emptied of liquid. When a dose of liquid is to be dispensed, the dispenser is reversed in such a way that its dispensing opening is in the lower position. The product then flows across this opening, whereas the piston progressively descends in the chamber until it covers the dispensing opening of the bottle. Such dispensers are relatively unreliable as far as the amounts of liquid which they allow to be dispensed is concerned. Because the amount of liquid dispensed depends on the pressure exerted by the piston at the time it is emptied, the amount of liquid dispensed is generally dependent upon the amount of liquid contained in the receptacle.

European Patent Application EP 0 274 256 proposes a metering dispenser which permits a solution to this problem as well as obtaining a dose which does not appreciably depend on the state of fullness of the receptacle. The forward movement of the piston in its metering chamber is controlled by the difference of the pressures to which the surfaces of the piston are subjected. This difference is constant regardless of what the amount of liquid in the receptacle due to a particular shaping of the dispensing opening and chamber. Accordingly, the piston of this dispenser can be adapted in a quite exact manner to the chamber in which it slides. If there is play between the piston and the chamber, the two amounts of liquid each side of the piston are in communication and the pressure differences on the surfaces of the piston are attenuated. If, on the other hand, the dimensions of the piston are slightly larger then the dimensions of the chamber, the downward movement of the piston will be slowed by friction. In both cases, the dose becomes inexact. Because pieces with exact dimensions are rarely obtained when they are molded of plastic material (plastic is the material which is most often used for such storage bottles), the manufacture of this dispenser is difficult due to loose molding tolerances.

SUMMARY OF THE INVENTION

The present invention is a metering bottle which overcomes these disadvantages. This metering bottle allows automatic metering of the amount of liquid to be dispensed, without complicated handling on the part of the user. Furthermore, it is of relatively simple construction and allows uncomplicated manufacture.

It is an object of the present invention to provide a metering bottle for containing a liquid comprising a reservoir with a neck. More specifically, it is also an object of the present invention to provide a metering chamber which communicates with the reservoir, the volume of said chamber being variable, the side walls of said chamber being constituted by a bellows, and the bottom of said chamber containing an opening. This opening in the bottom of the chamber is connected with a plunger tube extending into the reservoir. The opening is also provided with a valve which opens towards the interior of the chamber under when pressure is exerted from the reservoir towards the chamber, the end of the chamber opposite from said bottom being open and connected with a covering element designed to cover it in a substantially water-tight manner while being changed from a folded position of the chamber to an unfolded position, said end extending in the unfolded position of the chamber into the interior of the neck, the assembly comprising at least one passage which permits the evacuation of the air in the chamber when it is refolded.

In an advantageous manner the bellows forming the lateral walls of the chamber is an elastic element, which becomes relaxed when it is not subjected to any compressing constraint along its axis, the neck being connected with a cap equipped with a push element designed to be threaded into the interior of the neck and to rest on the open end of said bellows in order to maintain said bellows compressed in its folded position. The push element of the cap may also be the closing element of the open end of the oellows. The surface of the push element in the vicinity of where it rests on the open end of the bellows may be convex and essentially conform to the edges of said end. The cap and neck may be equipped with complementary threads, the push element being either put into contact with the free end of the bellows or retracted into the interior of the neck when the cap is screwed into or unscrewed from said neck.

The opening of the bottom of the chamber preferably is a round opening, the non-return valve associated with it comprising a ball the diameter of which is greater than the diameter of the opening, the ball cooperating in the closing position with the edges of said opening. The opening of the bottom of the chamber may be recessed into one of the ends of a conduit, the walls of which widen from said opening towards the interior of the chamber, said conduit being used for guiding the ball when it rises from or falls back on the bottom for the purpose of opening or closing said cpening.

The bottom of the chamber is advantageously pierced by at least one microhole used for the evacuation of air. The walls of the conduit can at least partially penetrate into the area of the reservoir and may be pierced in an area close to the neck by at least one microhole.

Preferably the bellows are a distinct part of the bottom of the chamber and may be placed on it by means of an annular skirt with which said bottom is equipped and on which the end of the bellows opposite its open end is fitted bY slight tightening. The bottom of the chamber may be the bottom of a cylindrical capsule open at its other end, the walls of which conform to the inner surface of the neck, its open end being equipped with an annular flange projecting towards the exterior for connection with said wall, the flange being placed on the edges of the neck.

The plunger tube is preferably joined to the opening of the bottom of the chamber by a tubular conduit to which it is fitted by slight tightening. The push element may be fitted by slight tightening on a flange with which the cap is equipped.

For better understanding the object of the present invention, an embodiment represented by the attached drawing will be described below in a purely illustrative and non-limiting manner.

DETAILED DESCRIPTION OF THE PREFERRED EMBODIMENT

Figure 1:
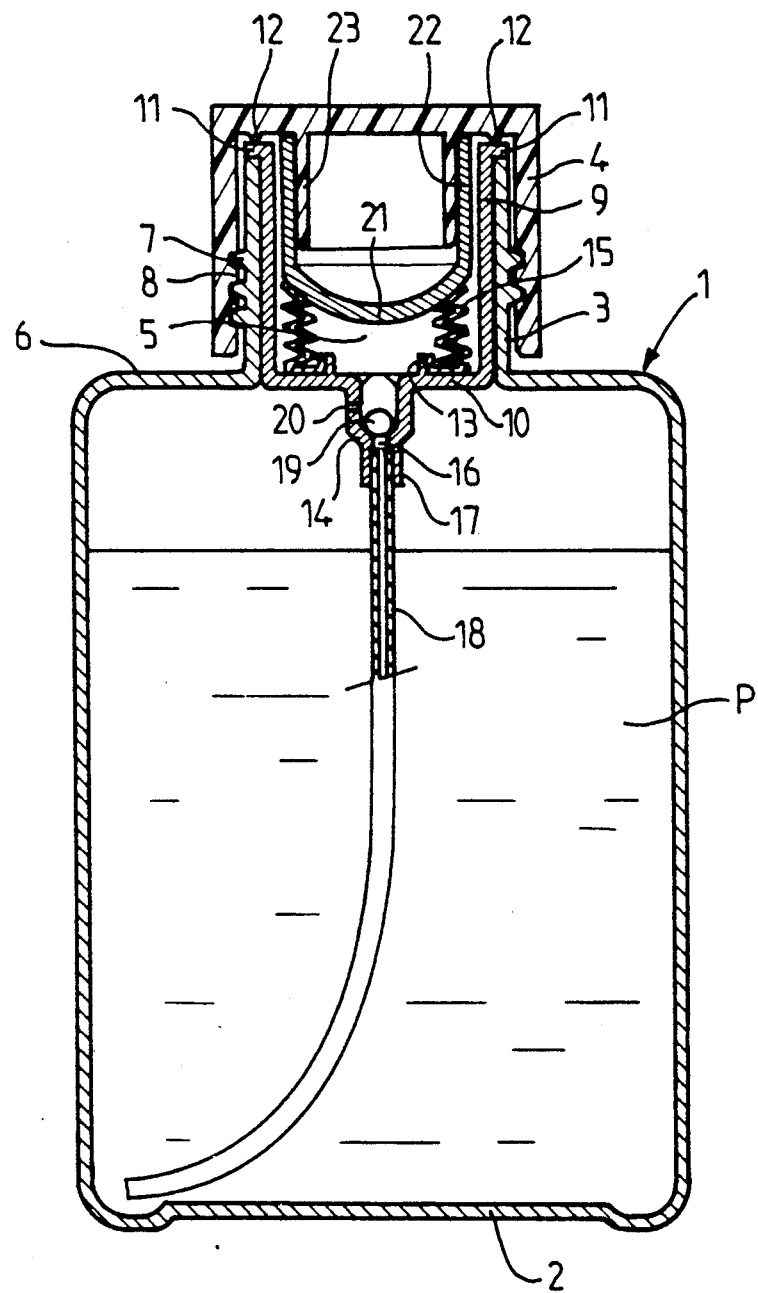
FIG. 1 is a sectional view of a metering bottle in accordance with the invention, closed with a cap screwed on its neck.
Figure 2:
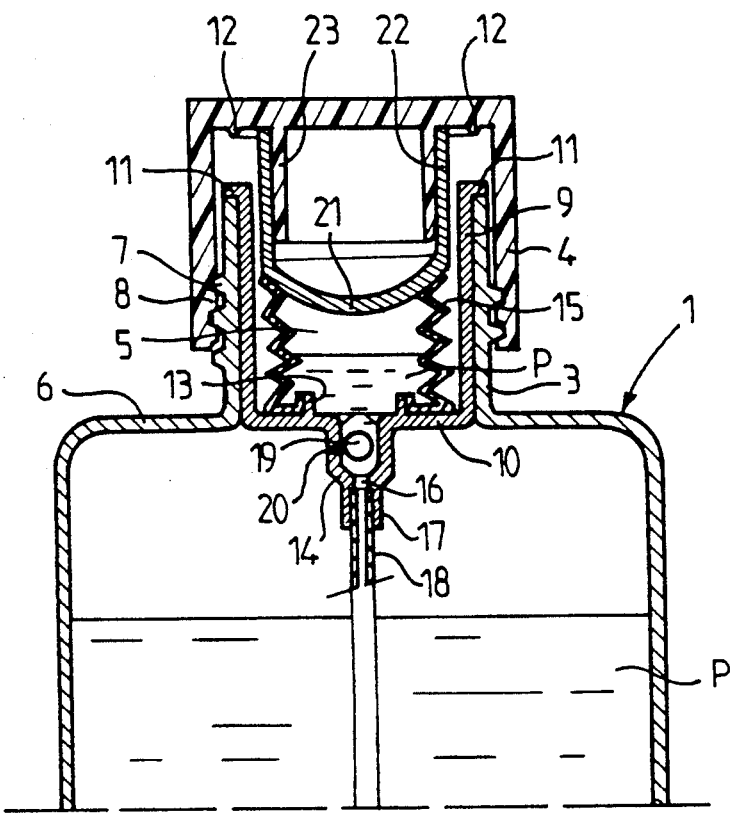
FIG. 2 is a sectional view of the upper part of the metering bottle of FIG. 1 with the cap partially unscrewed.
Figure 3:
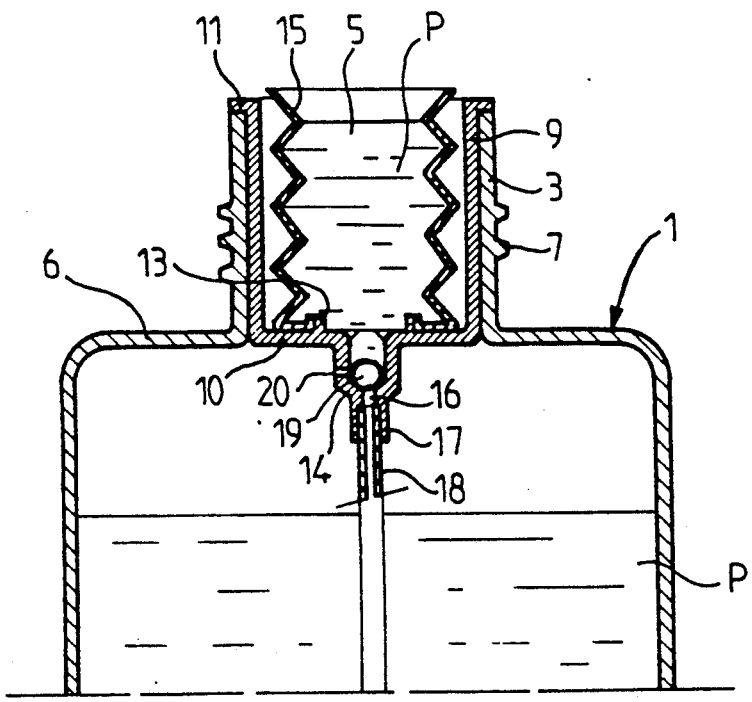
FIG. 3 is a sectional view of the upper part of the metering bottle of FIGS. 1 and 2 in which the metering chamber is tucked in and from which the cap has been removed.

FIG. 1 shows a metering bottle with receptacle 1, which is a hollow cylinder having a circular cross section with a bottom 2 and a neck 3 at its opposite end. The walls of neck 3 cooperate by means of their outer surface with cap 4 which is screwed onto and off of said neck. Neck 3 has on its inside a metering chamber 5 into which metered quantities (doses) of a liquid product P from receptacle 1 are aspirated.

Neck 3 is a cylindrical, tubular, cuff of circular cross section which provides a round opening in the wall 6 of said receptacle 1. Neck 3 also comprises on its exterior surface a thread 7 which cooperates with an interior thread 8 of cap 4.

Cap 4 is cylindrical; it has an open end and an end closed by a bottom. The interior diameter of cap 4 is slightly greater than the outer diameter of neck 3.

A cup-shaped capsule 3 is held in the interior of neck 3. Cup-shaped capsule 9 has a bottom 10 and a cylindrical wall which conforms to the interior surface of neck 3. The bottom of the capsule is located at the level of wall 6 so that it is flush with the inner surface of receptacle 1. The rim of the open end of capsule 9 is terminated by an annular flange 11. This flange projects outward over the top of neck 3 so that it rests on the top of the neck 3. The inside of cap 4 has an annular protuberance 12, which rests on flange 11 when cap 4 is screwed down.

Capsule 9 has, on the interior of its bottom 10, an annular skirt 13 which is centered on the axis of the receptacle 1. The outside of bottom 10 also has a conduit 14 which protrudes in the direction of the interior of reservoir 1. Conduit 14 has the same axis as does receptacle 1, its diameter being smaller than the diameter of the inner diameter of skirt 13.

An accordion-shaped bellows 15 is positioned on the outer surface of the skirt 13 so that it lines the inner walls of cup-like capsule 9. The inside of the accordion folds of bellows 15 essentially form a cylinder, the diameter of which is the outer diameter of the skirt 13. The exterior of the accordion folds of bellows 15 is disposed in a cylinder close to the inner surface of the wall of capsule 9.

A metering chamber 5 is therefore defined by the sides of bellows element 15, the bottom 10 of the cup-like capsule 9, and conduit 14. The bottom of the chamber 5 is opened towards the interior of the receptacle 1 by means of opening 16 at the lower end of conduit 14. Funnel-shaped conduit 14 widens opening 16 upward towards the plane of bottom 10. Tube-shaped conduit 17 extends opening 16 downward towards the interior of reservoir 1. Plunger tube 18 is fitted into conduit 17 so that plunger tube 18 extends into the liquid P of reservoir 1.

Funnel-shaped conduit 14 contains in its interior a spherical ball 19, the diameter of ball 19 being greater than the diameter of opening 16. If no force is exerted on ball 19 to push it upward toward chamber 5, it drops to the bottom of the conduit 14 and closes opening 16. Funnel-shaped conduit 14 also comprises a microhole 20 which extends through its wall. Microhole 20 is placed sufficiently far from opening 16 so that it is not closed by the sides of ball 19 when ball 19 falls to the bottom of funnel-shaped conduit 14 and closes opening 16.

Cup-shaped push element 21 is axially mounted on the inside of cap 4, its spheroidal bottom designed to rest on the top end of bellows 15 when cap 4 is in position on neck 3. Push element 21 is fixed to the inside of cap 4 via flange 23 portion of cap 4. Cup-shaped push element 21 is fitted over the outer surface 22 of flange 23 with a slight tightening. The length of flange 23 is such that, when cap 4 is fully screwed onto neck 3 in its closed position, push element 21 maintains bellows 15 in a compressed position.

Assembly of the bottle is relatively simple. Bellows 15 is placed inside capsule 9, and plunger tube 18 is fixed to conduit 17. Ball 19 is placed into conduit 14, and the edges of top opening of conduit 14 are deformed inward to prevent the ball 19 from falling out. Reservoir 1 is filled with the product P, and capsule 9 is inserted into the interior of neck 3 so that flange 11 rests against the free end of neck 3. Cap 4 is then screwed onto neck 3. These various parts of the metering bottle are molded from plastic material.

To use such a metering bottle, cap 4 is unscrewed from the screwed down position so that cap 4 rises axially along neck 3. The progressive rising of the push element 21 in the capsule 9 allows bellows 15, having been compressed up to now, to deploy itself elastically into a position where it is unfolded. Since push element 21 is placed in a water-tight manner on the free end of bellows 15, the increase in the volume of chamber 5 creates a pressure difference between the interior of chamber 5 and the interior of reservoir 1. This pressure difference lifts ball 19 and aspirates liquid P from reservoir 1 up through tube 18, through opening 16, and into chamber 5.

The rising of liquid P in chamber 5 takes place as long as push element 21, upwardly displaced with cap 4, provides water-tightness at the head of the bellows 15. When this water-tightness is broken by the removal of the cap 4 from the rest of the bottle, the liquid P in chamber 5 tends to descend back into the receptacle 1. Ball 19, however, falls back into the bottom of conduit 14, blocks opening 16, and prevents liquid P in chamber 5 from descending back.

The user now has at his/her disposal a dose of the product of a volume essentially equal to that of chamber 5. Once liquid P contained in chamber 5 has been used, cap 4 is screwed back on neck 3. Push element 21 again rests on the edges of the free opening of chamber 5 by means of its spheroidal surface, bellows 15 is again compressed, and the air in chamber 5 is compressed. This air, which cannot escape through opening 16 due to ball 19, is driven into reservoir 1 through microhole 20 so that the pressure difference between reservoir 1 and metering chamber 5 is equalized. This volume of air is essentially equal to the volume of the liquid P discharged from reservoir 1.

I claim:

1. A metering bottle for holding a supply of liquid and for dispensing doses of the liquid, each dose being a predetermined amount of the liquid, comprising:

collapsible bellows means, having a predetermined volume when uncollapsed, for holding a dose of the liquid;

reservoir means for holding the supply of the liquid, said reservoir means including a neck surrounding said bellows means, said reservoir means including passage means for dispensing the liquid;

pressure operated one-way valve means disposed in said passage means between the bellows means and the reservoir means, for allowing the liquid to pass from the reservoir means into the bellows means through said passage means when the pressure in the bellows means is less than the pressure in the reservoir means; and removable cap means engageable with said neck and having means for operating the bellows means, the operating means holding the bellows means collapsed when the cap means is engaged on said neck to close said valve means in said passage means, the bellows means becoming uncollapsed while the cap means is being removed from the bellows means such that a suction is developed by the bellows means, the suction being a vacuum predetermined by the volume of the bellows means, the uncollapsing of said bellows means making the pressure in the bellows means less than the pressure in the reservoir means so that the bellows means is filled through the one-way valve means with a dose of the liquid, wherein said bellows means has an open end, said operating means of said removable cap means is equipped with a push element which extends down from the inside of the cap means, the push element having a semi-spherical face for engaging said open end of said bellows means, for collapsing the bellows means, and for forming a water-tight seal with said open end of said bellows means.

2. The metering bottle of claim 1 wherein:

the pressure operated one-way valve means further comprises an air microhole between the reservoir means and the bellows means, wherein placing the cap means onto the uncollapsed bellows means when the bellows means does not contain liquid and then moving the cap means to the closed position causes a predetermined increase in pressure in said bellows means, the predetermined increase in pressure in the bellows means being dissipated into the reservoir means through the air microhole.

3. The metering bottle of claim 1 wherein:

the pressure operated one-way valve means comprises:

a ball of a first diameter; and a vertical conduit containing the ball, said conduit having opposite ends each having an opening, one of said openings being adjacent said reservoir means and being closable by said ball, the inside length of the conduit being longer than the diameter of the ball so that the ball is free to move up and down inside the conduit, the opening in the bottom end of the conduit leading to the reservoir means, the opening in the top end of the conduit leading to the bellows means.

4. The metering bottle of claim 1 wherein said passage means includes a hollow plunger tube which extends to the bottom of the reservoir means.

5. The metering bottle of claim 1 wherein said neck is cylindrical in shape, the metering bottle further comprising:

a cup-like cylindrical capsule, the outer diameter of the cylindrical capsule fitting water-tight into the cylindrical neck of the reservoir means, the bellows means being located inside the capsule, the bottom of the capsule incorporating the one-way valve means.

6. The metering bottle of claim 5 wherein the bellows means takes the form of a vertically oriented cylindrical body having an axis through opposited ends, one of said ends of the bellows means engaging the semi-spherical face of the push element of the cap means, the other of said ends of the bellows means engaging the inside of the bottom of the capsule, the bellows means having an accordion shape and being collapsible in a direction parallel to said axis.

7. The metering bottle of claim 5 wherein the outer surface of the cylindrical neck of the reservoir means and the inner surface of the cap means are equipped with complementary threads so that the cap means can be unscrewed from and screwed onto the reservoir means.

* * * * *